US012118336B2

(12) United States Patent
Wei et al.

(10) Patent No.: US 12,118,336 B2
(45) Date of Patent: Oct. 15, 2024

(54) METHOD FOR PRESENTING ASSOCIATED CONFLICT BLOCK AND DEVICE

(71) Applicant: Huawei Cloud Computing Technologies Co., Ltd., Guizhou (CN)

(72) Inventors: Zhao Wei, Gui'an (CN); Guangtai Liang, Beijing (CN); Shanbin Cheng, Beijing (CN); Qianxiang Wang, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 157 days.

(21) Appl. No.: 17/852,721

(22) Filed: Jun. 29, 2022

(65) Prior Publication Data

US 2022/0334812 A1    Oct. 20, 2022

Related U.S. Application Data

(63) Continuation of application No. PCT/CN2020/114557, filed on Sep. 10, 2020.

(30) Foreign Application Priority Data

Dec. 31, 2019   (CN) .......................... 201911417340.3

(51) Int. Cl.
*G06F 8/41* (2018.01)
*G06F 8/77* (2018.01)

(52) U.S. Cl.
CPC ................ *G06F 8/433* (2013.01); *G06F 8/77* (2013.01)

(58) Field of Classification Search
CPC ........................................................ G06F 8/71
(Continued)

(56) References Cited

U.S. PATENT DOCUMENTS 9,110,769 B2 *  8/2015  Zhang ..................... G06F 8/751
9,557,965 B2 *  1/2017  Santos Luaces .......... G06F 8/71
(Continued)

FOREIGN PATENT DOCUMENTS

CN          101697121 A      4/2010
CN          105183789 A     12/2015
(Continued)

OTHER PUBLICATIONS

English Translation for Foreigns Patent Documents (N-P).*
(Continued)

*Primary Examiner* — Francisco J Aponte
(74) *Attorney, Agent, or Firm* — Conley Rose, P.C.

(57) ABSTRACT

A method for presenting an associated conflict block comprises obtaining a first conflict file comprising a plurality of first code blocks, wherein a second code block of the first code blocks comprises a first code snippet of a current version of the second code block, a second code snippet of a basic version of the second code block, and a third code snippet of a to-be-merged version of the second code block. A first instruction triggered on a user interface for activating a to-be-processed code block is received, wherein a first type of the to-be-processed code block is of an unresolved conflict block or a single-side change block. A fourth code snippet comprised in the to-be-processed code block and indexes of N associated code blocks of the to-be-processed code block is presented on the user interface.

20 Claims, 9 Drawing Sheets

(58) Field of Classification Search
USPC .......................................................... 717/103
See application file for complete search history.

(56) References Cited

U.S. PATENT DOCUMENTS

| | | | | |
|---|---|---|---|---|
| 10,146,530 | B1* | 12/2018 | Rajput | G06F 8/71 |
| 10,719,336 | B1* | 7/2020 | Tsybulnyk | G06F 9/44552 |
| 10,915,429 | B2* | 2/2021 | Katoch | G06F 8/30 |
| 10,996,931 | B1* | 5/2021 | Mohajer | G10L 15/1822 |
| 11,144,311 | B2* | 10/2021 | Wuensche | G06F 8/77 |
| 11,175,972 | B1* | 11/2021 | Elżbieciak | G06F 21/629 |
| 11,340,898 | B1* | 5/2022 | Sabharwal | G06N 7/01 |
| 11,847,442 | B2* | 12/2023 | Sagal | G06F 8/71 |
| 11,853,746 | B2* | 12/2023 | Groenewegen | G06F 8/70 |
| 11,875,287 | B2* | 1/2024 | Vlasov | G06Q 10/103 |
| 11,924,056 | B2* | 3/2024 | Link | H04L 41/082 |
| 2014/0188852 | A1* | 7/2014 | Clemm | G06F 16/16 707/722 |
| 2015/0089476 | A1* | 3/2015 | Dhoolia | G06F 8/72 717/122 |
| 2015/0220332 | A1* | 8/2015 | Bernstein | G06F 16/1873 717/121 |
| 2017/0083310 | A1* | 3/2017 | Barry | G06F 8/71 |
| 2017/0286077 | A1* | 10/2017 | Haswell | G06F 8/42 |
| 2018/0260212 | A1 | 9/2018 | Wisnovsky | |
| 2019/0339964 | A1 | 11/2019 | Young | |
| 2019/0339967 | A1* | 11/2019 | Moondhra | G06F 16/2246 |
| 2019/0361686 | A1* | 11/2019 | Gnazdowsky | G06F 8/65 |
| 2020/0192638 | A1* | 6/2020 | Pezaris | G06F 8/41 |
| 2022/0164672 | A1* | 5/2022 | Bird | G06N 3/088 |
| 2022/0334812 | A1 | 10/2022 | Wei et al. | |
| 2022/0365775 | A1* | 11/2022 | Wei | G06F 8/72 |
| 2023/0281005 | A1* | 9/2023 | Groenewegen | G06F 11/3688 717/120 |
| 2024/0028729 | A1* | 1/2024 | Liu | G06F 8/65 |

FOREIGN PATENT DOCUMENTS

| | | | | |
|---|---|---|---|---|
| CN | 106126410 | A | | 11/2016 |
| CN | 108073501 | A | | 5/2018 |
| CN | 109308253 | A | | 2/2019 |
| CN | 110147407 | A | | 8/2019 |
| CN | 110489087 | A | | 11/2019 |
| CN | 111176983 | A | * | 5/2020 ......... G06F 11/3608 |
| CN | 111190583 | A | | 5/2020 |
| CN | 115098109 | A | * | 9/2022 |
| CN | 115469844 | A | * | 12/2022 |
| WO | 2012088173 | A1 | | 6/2012 |
| WO | 2014189553 | A1 | | 11/2014 |

OTHER PUBLICATIONS

Nicholas Nelson et al. "The life-cycle of merge conflicts: processes, barriers, and strategies"; Empirical Software Engineering (2019).*

Marconi Lanna et al. "Spotting the difference"; Software—Practice and Experience Softw. Pract. Exper. 2011; 41:607-626, Published online Oct. 6, 2010.*

Otth, Martin "Fine-grained software version control based on a program's abstract syntax tree"; Oct. 2014—Chair of Programming Methodology Department of Computer Science ETH Zurich.*

David Huang "A Version Control Interface for Graphical Discrete-Event Models"; University of Illinois at Urbana-Champaign, 2019.*

Apel, Sven, et al. "Semistructured Merge in Revision Control Systems." VaMoS. 2010, 7 pages.

Gao Li-ping et al.,"Research on Semantic Conflict Resolution in Real-time Collaborative Programming Environment", Journal of Chinese Computer Systems, vol. 40, No. 4, 2019, with an English machine translation, 24 pages.

Cavalcanti, et al., "Evaluating and improving semistructured merge," Proceedings of the ACM on Programming Languages 1.OOPSLA, 2017, Article 59, 27 pages.

"KDiff3—Homepage," printed Feb. 16, 2023, 8 pages.

"Beyond Compare Chinese edition," printed Feb. 16, 2023, 5 pages.

"Meld," printed Feb. 16, 2023, 2 pages.

"Sublimerge: The professional diff and merge tool for Sublime Text," printed Feb. 16, 2023, 3 pages.

Qiuyuan et al., "Research progress of code clone detection," CNKI:SUN:RJXB.0., 2019, with an English abstract, 19 pages.

"Google-java-format",. https://github.com/google/google-java-format/releases, printed Feb. 16, 2023, 6 pages.

"Jaccard index—Wikipedia," printed Feb. 16, 2023, 10 pages.

\* cited by examiner

| Conflict file view | Project view | | Exit | Save | Conflict file: | ↑312↓ /325 | Conflict block: | ↑10↓ /33 | Single-side change block: | ↑13↓ /93 |
|---|---|---|---|---|---|---|---|---|---|---|

| | | Ours  File 313 | Base  File 313 | Theirs  File 313 |
|---|---|---|---|---|
| File 1 | ○ | Code snippet of an Ours version of the tenth conflict block | Code snippet of a Base version of the tenth conflict block | Code snippet of a Theirs version of the tenth conflict block |
| File 2 | ○ | | | |
| File 3 | ○ | | | |
| File 4 | ○ | | | |
| File 5 | ○ | | | |
| File 6 | ○ | | | |

File comparison ☑

| Use Ours | Use Ours | Use Ours and Theirs | Use Theirs and Ours |
|---|---|---|---|

Original code of the tenth conflict block in the conflict file 313

← Previous conflict block     Next conflict block →

☑ Back to current followed code block:
Conflict Block 4 of File 2
Code block that it depends on
Single-Side Change 13 of File 2
Code block that depends on it
Conflict Block 10 of File 313  ☑
Similar code block  ☑
Conflict Block 20 of File 313

FIG. 9

METHOD FOR PRESENTING ASSOCIATED CONFLICT BLOCK AND DEVICE

CROSS-REFERENCE TO RELATED APPLICATIONS

This is a continuation of International Patent Application No. PCT/CN2020/114557 filed on Sep. 10, 2020, which claims priority to Chinese Patent Application No. 201911417340.3 filed on Dec. 31, 2019. The disclosures of the aforementioned applications are hereby incorporated by reference in their entireties.

TECHNICAL FIELD

This disclosure relates to the field of software development technologies, and in particular, to a method for presenting an associated conflict block and a device.

BACKGROUND

During software development, different project teams perform concurrent development based on a same version of code. After the development is complete, code developed by each project team needs to be merged for function combination or the like. However, if different project teams make different changes to a same code entity in a basic version during development, a code conflict occurs during merging. A large quantity of users uses a SemanticMerge tool to automatically resolve a conflict block. However, the tool cannot completely resolve all conflicts generated during code merge. In other words, complete resolution of a code conflict still depends on manual participation, and how to improve manual resolution efficiency becomes a main problem.

The SemanticMerge tool displays internal insight information about a conflict block that cannot be automatically resolved, for example, change information of a current version relative to a basic version and change information of a to-be-merged version relative to the basic version. When performing resolution, a user can intuitively learn, by using the insight information, differences between code snippets of three versions included in a current conflict block. However, when performing resolution, the user needs to view code snippets of an associated conflict block more frequently. The foregoing method only provides internal insight information of the current conflict block, and cannot meet a requirement of the user for quickly locating the associated conflict block.

SUMMARY

This disclosure provides a method for presenting an associated conflict block and a device, to improve efficiency of manually resolving a conflict block.

According to a first aspect, this disclosure provides a method for presenting an associated conflict block, including obtaining a first conflict file, where the first conflict file includes a plurality of code blocks, and each code block includes a code snippet of a current version of the code block, a code snippet of a basic version of the code block, and a code snippet of a to-be-merged version of the code block, receiving a first instruction triggered on a user interface for activating a to-be-processed code block, where a type of the to-be-processed code block is an unresolved conflict block or a single-side change block, and presenting, on the user interface, a code snippet included in the to-be-processed code block and indexes of N associated code blocks of the to-be-processed code block.

A type of each associated code block is one of an unresolved conflict block, a single-side change block, and a resolved conflict block, an association relationship between each associated code block and the to-be-processed code block is one of a dependency relationship, a depended relationship, and a similarity relationship, and N is greater than or equal to 1.

In a possible design, the method further includes receiving a second instruction triggered on the user interface for activating any associated code block, and switching the user interface from presenting the code snippet included in the to-be-processed code block to presenting a code snippet included in the associated code block.

In a possible design, the user interface has a dependency group, a depended group, and a similarity group. Presenting, on the user interface, indexes of N associated code blocks of the to-be-processed code block includes presenting an index of each associated code block in the dependency group, the depended group, or the similarity group based on an association relationship between each associated code block and the to-be-processed code block.

In a possible design, before presenting, on the user interface, indexes of N associated code blocks of the to-be-processed code block, the method further includes determining at least one associated code block of the to-be-processed code block from the first conflict file.

In a possible design, before presenting, on the user interface, indexes of N associated code blocks of the to-be-processed code block, the method further includes obtaining a second conflict file, and determining at least one associated code block of the to-be-processed code block from the second conflict file.

In a possible design, determining at least one associated code block of the to-be-processed code block from the first conflict file includes determining, from the first conflict file based on usage of a variable and/or a function in the to-be-processed code block in another code block of the first conflict file, an associated code block that has the dependency relationship with the to-be-processed code block and an associated code block that has the depended relationship with the to-be-processed code block, and/or determining, from the first conflict file based on a token string and an abstract syntax subtree that are corresponding to each code snippet included in the to-be-processed code block, an associated code block that has the similarity relationship with the to-be-processed code block.

In a possible design, presenting an index of each associated code block in the dependency group, the depended group, or the similarity group based on an association relationship between each associated code block and the to-be-processed code block includes presenting, in the dependency group, a code block that is in the N associated code blocks and that has the dependency relationship with the to-be-processed code block, presenting, in the depended group, a code block that is in the N associated code blocks and that has the depended relationship with the to-be-processed code block, and presenting, in the similarity group, a code block that is in the N associated code blocks and that has the similarity relationship with the to-be-processed code block.

In a possible design, determining, from the first conflict file based on usage of a variable and/or a function in the to-be-processed code block in another code block of the first conflict file, an associated code block that has the dependency relationship with the to-be-processed code block includes, if the variable defined in the to-be-processed code block is used in a total of M other code blocks in the first conflict file, determining that the M code blocks are all associated code blocks that have the dependency relationship with the to-be-processed code block.

In a possible design, determining, from the first conflict file based on usage of a variable and/or a function in the to-be-processed code block in another code block of the first conflict file, an associated code block that has the depended relationship with the to-be-processed code block includes, if the variable used in the to-be-processed code block is defined in a total of K other code blocks in the first conflict file, determining that the K code blocks are all associated code blocks that have the depended relationship with the to-be-processed code block.

In a possible design, determining, from the first conflict file based on a token string and an abstract syntax subtree that are corresponding to each code snippet included in the to-be-processed code block, an associated code block that has the similarity relationship with the to-be-processed code block includes, for each code block other than the to-be-processed code block in the plurality of code blocks included in the first conflict file, calculating token strings separately corresponding to code snippets of three versions included in the to-be-processed code block and a token similarity of code snippets of each version among the token strings separately corresponding to code snippets of three versions included in the code block, for each code block other than the to-be-processed code block in the plurality of code blocks included in the first conflict file, calculating abstract syntax subtrees separately corresponding to code snippets of three versions included in the to-be-processed code block and a structure similarity of code snippets of each version among the abstract syntax subtrees separately corresponding to code snippets of three versions included in the code block, and determining, based on the code snippets of the three versions included in the to-be-processed code block, and the token similarity and the structure similarity of the code snippets of each version among the code snippets of the three versions included in each code block, the associated code block that has the similarity relationship with the to-be-processed code block.

In a possible design, the method further includes, for each code block included in the first conflict file, storing a variable and/or a function defined in the code block, and a used variable and/or function, and determining whether a variable defined in the to-be-processed code block is used in another code block other than the to-be-processed code block in the first conflict file, and determining whether a variable used in the to-be-processed code block is defined in another code block other than the to-be-processed code block in the first conflict file.

In a possible design, calculating abstract syntax subtrees separately corresponding to code snippets of three versions included in the to-be-processed code block and a structure similarity of code snippets of each version among the abstract syntax subtrees separately corresponding to code snippets of three versions included in the code block includes determining, based on row number ranges of the code snippets of the three versions included in the to-be-processed code block, the abstract syntax subtrees separately corresponding to the code snippets of the three versions included in the to-be-processed code block, for each code block other than the to-be-processed code block in the plurality of code blocks included in the first conflict file, determining, based on row number ranges of the code snippets of the three versions included in the code block, the abstract syntax subtrees separately corresponding to the code snippets of the three versions included in the code block, and determining, based on the abstract syntax subtrees separately corresponding to the code snippets of the three versions included in the to-be-processed code block and the abstract syntax subtrees separately corresponding to the code snippets of the three versions included in each code block, a structure similarity of code snippets of each version between the code snippets of the three versions included in the to-be-processed code block and the code snippets of the three versions included in each code block.

In a possible design, determining, based on row number ranges of the code snippets of the three versions included in the to-be-processed code block, the abstract syntax subtrees separately corresponding to the code snippets of the three versions included in the to-be-processed code block includes, for a code snippet of a first version in the code snippets of the three versions included in the to-be-processed code block, parsing a code file in which the code snippet of the first version is located, to obtain an abstract syntax tree corresponding to the code file, and searching the abstract syntax tree, and determining a subtree whose row number range falls within a row number range corresponding to the code snippet of the first version as an abstract syntax subtree corresponding to the code snippet of the first version.

In a possible design, determining, based on the code snippets of the three versions included in the to-be-processed code block, and the token similarity and the structure similarity of the code snippets of each version among the code snippets of the three versions included in each code block, the associated code block that has the similarity relationship with the to-be-processed code block includes, for a code snippet of a first version in the code snippets of the three versions included in the to-be-processed code block, and a code snippet of a first version in the code snippets of the three versions included in each code block, performing weighted averaging on a token similarity and a structure similarity between the code snippet of the first version of the to-be-processed code block and the code snippet of the first version of each code block, to obtain a first similarity value between the code snippet of the first version of the to-be-processed code block and the code snippet of the first version of each code block, performing weighted averaging on three first similarity values between the code snippets of the three versions included in the to-be-processed code block and the code snippets of the three versions included in each code block, to obtain a second similarity value between the code snippets of the three versions included in the to-be-processed code block and the code snippets of the three versions included in each code block, and determining a code block whose second similarity value is greater than a preset threshold as the associated code block that has the similarity relationship with the to-be-processed code block.

According to a second aspect, this disclosure provides a terminal device, including an obtaining module configured to obtain a first conflict file, where the first conflict file includes a plurality of code blocks, and each code block includes a code snippet of a current version of the code block, a code snippet of a basic version of the code block, and a code snippet of a to-be-merged version of the code block, a receiving module configured to receive a first instruction triggered on a user interface for activating a to-be-processed code block, where a type of the to-be-processed code block is an unresolved conflict block or a single-side change block, and a presentation module configured to present, on the user interface, a code snippet included in the to-be-processed code block and indexes of N associated code blocks of the to-be-processed code block.

A type of each associated code block is one of an unresolved conflict block, a single-side change block, and a resolved conflict block, an association relationship between each associated code block and the to-be-processed code block is one of a dependency relationship, a depended relationship, and a similarity relationship, and N is greater than or equal to 1.

In a possible design, the receiving module is further configured to receive a second instruction triggered on the user interface for activating any associated code block.

The presentation module is further configured to switch the user interface from presenting the code snippet included in the to-be-processed code block to presenting a code snippet included in the associated code block.

In a possible design, the user interface has a dependency group, a depended group, and a similarity group. The presentation module is further configured to present an index of each associated code block in the dependency group, the depended group, or the similarity group based on an association relationship between each associated code block and the to-be-processed code block.

In a possible design, the terminal device further includes a dependency analysis module and a similarity analysis module. The dependency analysis module and the similarity analysis module are configured to determine at least one associated code block of the to-be-processed code block from the first conflict file.

In a possible design, the obtaining module is further configured to obtain a second conflict file.

The dependency analysis module and the similarity analysis module are further configured to determine at least one associated code block of the to-be-processed code block from the second conflict file.

In a possible design, the dependency analysis module and the similarity analysis module are further configured to determine, from the first conflict file based on usage of a variable and/or a function in the to-be-processed code block in another code block of the first conflict file, an associated code block that has the dependency relationship with the to-be-processed code block and an associated code block that has the depended relationship with the to-be-processed code block, and/or determine, from the first conflict file based on a token string and an abstract syntax subtree that are corresponding to each code snippet included in the to-be-processed code block, an associated code block that has the similarity relationship with the to-be-processed code block.

In a possible design, the presentation module is further configured to present, in the dependency group, a code block that is in the N associated code blocks and that has the dependency relationship with the to-be-processed code block, present, in the depended group, a code block that is in the N associated code blocks and that has the depended relationship with the to-be-processed code block, and present, in the similarity group, a code block that is in the N associated code blocks and that has the similarity relationship with the to-be-processed code block.

In a possible design, the dependency analysis module is further configured to, if the variable defined in the to-be-processed code block is used in a total of M other code blocks in the first conflict file, determine that the M code blocks are all associated code blocks that have the dependency relationship with the to-be-processed code block.

In a possible design, the dependency analysis module is further configured to, if the variable used in the to-be-processed code block is defined in a total of K other code blocks in the first conflict file, determine that the K code blocks are all associated code blocks that have the depended relationship with the to-be-processed code block.

In a possible design, the similarity analysis module is further configured to, for each code block other than the to-be-processed code block in the plurality of code blocks included in the first conflict file, calculate token strings separately corresponding to code snippets of three versions included in the to-be-processed code block and a token similarity of code snippets of each version between the token strings separately corresponding to code snippets of three versions included in the code block, for each code block other than the to-be-processed code block in the plurality of code blocks included in the first conflict file, calculate abstract syntax subtrees separately corresponding to code snippets of three versions included in the to-be-processed code block and a structure similarity of code snippets of each version between the abstract syntax subtrees separately corresponding to code snippets of three versions included in the code block, and determine, based on the code snippets of the three versions included in the to-be-processed code block, and the token similarity and the structure similarity of the code snippets of each version among the code snippets of the three versions included in each code block, the associated code block that has the similarity relationship with the to-be-processed code block.

In a possible design, the dependency analysis module is further configured to, for each code block included in the first conflict file, store a variable and/or a function defined in the code block, and a used variable and/or function, and determine whether a variable defined in the to-be-processed code block is used in another code block other than the to-be-processed code block in the first conflict file, and determine whether a variable used in the to-be-processed code block is defined in another code block other than the to-be-processed code block in the first conflict file.

In a possible design, the similarity analysis module is further configured to determine, based on row number ranges of the code snippets of the three versions included in the to-be-processed code block, the abstract syntax subtrees separately corresponding to the code snippets of the three versions included in the to-be-processed code block, for each code block other than the to-be-processed code block in the plurality of code blocks included in the first conflict file, determine, based on row number ranges of the code snippets of the three versions included in the code block, the abstract syntax subtrees separately corresponding to the code snippets of the three versions included in the code block, and determine, based on the abstract syntax subtrees separately corresponding to the code snippets of the three versions included in the to-be-processed code block and the abstract syntax subtrees separately corresponding to the code snippets of the three versions included in each code block, a structure similarity of code snippets of each version between the code snippets of the three versions included in the to-be-processed code block and the code snippets of the three versions included in each code block.

In a possible design, the similarity analysis module is further configured to, for a code snippet of a first version in the code snippets of the three versions included in the to-be-processed code block, parse a code file in which the code snippet of the first version is located, to obtain an abstract syntax tree corresponding to the code file, and search the abstract syntax tree, and determine a subtree whose row number range falls within a row number range corresponding to the code snippet of the first version as an abstract syntax subtree corresponding to the code snippet of the first version.

In a possible design, the similarity analysis module is further configured to, for a code snippet of a first version in the code snippets of the three versions included in the to-be-processed code block, and a code snippet of a first version in the code snippets of the three versions included in each code block, perform weighted averaging on a token similarity and a structure similarity between the code snippet of the first version of the to-be-processed code block and the code snippet of the first version of each code block, to obtain a first similarity value between the code snippet of the first version of the to-be-processed code block and the code snippet of the first version of each code block, perform weighted averaging on three first similarity values between the code snippets of the three versions included in the to-be-processed code block and the code snippets of the three versions included in each code block, to obtain a second similarity value between the code snippets of the three versions included in the to-be-processed code block and the code snippets of the three versions included in each code block, and determine a code block whose second similarity value is greater than a preset threshold as the associated code block that has the similarity relationship with the to-be-processed code block.

According to a third aspect, this disclosure provides a terminal device, including a memory and a processor.

The memory is configured to store program instructions, and the processor is configured to invoke the program instructions in the memory to perform the method for presenting an associated conflict block.

According to a fourth aspect, this disclosure provides a readable storage medium. The readable storage medium stores a computer program, and when the computer program is executed, the method for presenting an associated conflict block is implemented.

According to the method for presenting an associated conflict block and the device provided in this disclosure, an associated code block list of a current conflict block is obtained by using a dependency analysis module and a similarity analysis module, so that after the current conflict block is activated, a terminal device may present indexes of these associated code blocks on a user interface. When a user needs to view a code snippet included in an associated code block, the user clicks an index of the associated code block, and the user interface may switch to the code snippet included in the associated code block. In this way, the user can quickly find a definition and usage of a variable and/or a function in the current conflict block, and can refer to a solution for resolving a code block that is similar to the current conflict block and that has been resolved. This greatly improves efficiency of resolving a conflict block by the user.

BRIEF DESCRIPTION OF DRAWINGS

FIG. 9 is a schematic diagram of a user interface according to this disclosure;

DESCRIPTION OF EMBODIMENTS

Figure 1:
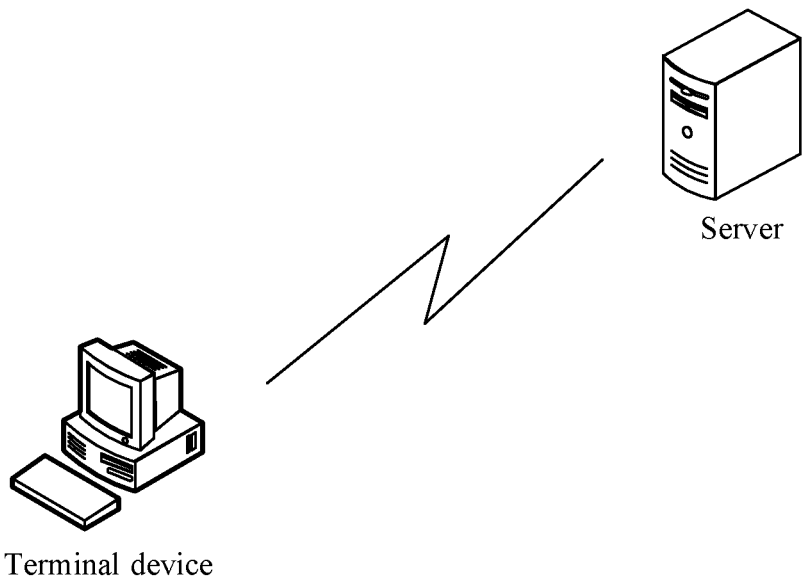
FIG. 1 is a system framework diagram according to this disclosure.

The following describes some terms in this disclosure, to help persons skilled in the art have a better understanding.

(1) Code files of three versions: The code files of three versions include a code file of a current version, a code file of a basic version, and a code file of a to-be-merged version. Code included in the code file of the current version and code included in the code file of the to-be-merged version are code obtained through further development on the basis of code included in the code file of the basic version.

For ease of description, the current version is referred to as an "Ours version", the basic version is referred to as a "Base version", and the to-be-merged version is referred to as a "Theirs version" in the following. It can be understood that the Ours version, the Base version, and the Theirs version are merely examples of names used to clearly describe solutions of this disclosure. Persons skilled in the art may use another name, and solutions obtained when steps of this disclosure are implemented by using the other name fall within the protection scope of this disclosure.

(2) Code merge: The code included in the code file of the Ours version needs to be merged with the code included in the code file of the Theirs version for function combination or the like.

(3) Code conflict: For a same code entity in the code file of the Base version, if different changes are made to the code entity in the Ours version and the Theirs version, the code conflict occurs during code merge. For example, if a same variable in the Base version is named differently in the Ours version and the Theirs version, a code conflict about the variable occurs during code merge.

(4) Single-side change: For the same code entity in the code file of the Base version, only one version of the Ours version and the Theirs version is changed. In this case, a party that makes the change can be directly used during code merge.

(5) Conflict file: The conflict file is a file generated through code merge. The conflict file includes two parts: a successfully merged part and several conflict parts. Identifiers such as "<<<<<<<", "|||||||", "=======", and ">>>>>>>" can be used to divide code snippets of different versions corresponding to each conflict part. For example, in the conflict file, a code snippet between "<<<<<<<" and "|||||||" can be used as a code snippet of the Ours version in the conflict part, a code snippet between "|||||||" and "=======" can be used as a code snippet of the Base version in the conflict part, and a code snippet between "=======" and ">>>>>>>" can be used as a code snippet of the Theirs version in the conflict part.

It may be understood that, in conflict files generated by different merge tools, different identifiers are used for dividing code snippets of different versions. The foregoing identifiers are merely examples, and this disclosure is not limited thereto. The following describes the solutions of this disclosure by using such identifiers as an example.

(6) Conflict block: During code merge, one conflict corresponds to one conflict block. Each conflict block contains a code snippet of the Ours version, a code snippet of the Base version, and a code snippet of the Theirs version. The following describes how to parse the conflict block from the conflict file.

(7) Single-side change block: During code merge, one single-side change corresponds to one single-side change block. Each single-side change block contains a code snippet of the Ours version, a code snippet of the Base version, and a code snippet of the Theirs version. The following describes how to extract the single-side change block from the conflict file.

In the conventional technology, during code merge, a semantic merge SemanticMerge tool is mostly used to automatically resolve a conflict block. For a conflict block that cannot be automatically resolved, internal insight information of the conflict block is displayed, for example, change information of an Ours version relative to a Base version and change information of a Theirs version relative to the Base version. When performing resolution, a user can intuitively learn, by using the insight information, differences between code snippets of three versions included in a current conflict block. However, when performing resolution, the user usually needs to search another code block for a definition and usage of a variable and/or a function in the current conflict block, or refer to a solution for resolving a code block that is similar to the current conflict block and that has been resolved. The foregoing method only provides internal insight information of the current conflict block, and cannot meet a requirement of the user for quickly locating an associated conflict block.

Figure 2:
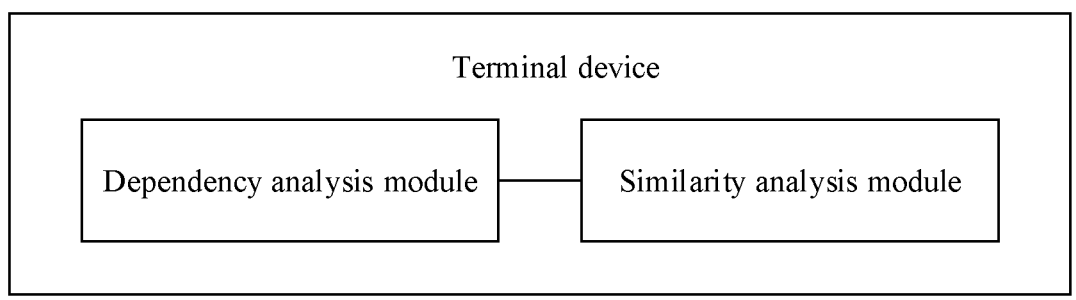
FIG. 2 is a schematic diagram of a structure of a terminal device according to this disclosure.

FIG. 1 is a system framework diagram according to this disclosure. As shown in FIG. 1, a system provided in this disclosure includes a terminal device and a server. FIG. 2 is a schematic diagram of a structure of the terminal device according to this disclosure. As shown in FIG. 2, the terminal device includes a dependency analysis module and a similarity analysis module. The dependency analysis module is configured to determine, from a conflict file, an associated code block that has a dependency relationship with a to-be-processed code block, and an associated code block that has a depended relationship with the to-be-processed code block. The similarity analysis module is configured to determine, from the conflict file, an associated code block that has a similarity relationship with the to-be-processed code block. The server is configured to store an associated code block list obtained by the dependency analysis module and the similarity analysis module by analyzing the conflict file.

Optionally, the terminal device may be a desktop computer, a mobile phone, a tablet computer, a notebook computer, a smartwatch, a television, or another electronic device having a display. The server may be a device having a corresponding processing capability, such as a physical server or a cloud server.

In the conventional technology, only internal insight information of a current conflict block is provided, and consequently, a user cannot quickly locate an associated conflict block of the current conflict block when performing resolution. Therefore, in this disclosure, an associated code block list of the current conflict block is obtained by using the dependency analysis module and the similarity analysis module, so that after the current conflict block is activated, the terminal device may present indexes of these associated code blocks on a user interface. When the user needs to view a code snippet included in an associated code block, the user clicks an index of the associated code block, and the user interface may switch to the code snippet included in the associated code block. In this way, the user can quickly find a definition and usage of a variable and/or a function in the current conflict block, and can refer to a solution for resolving a code block that is similar to the current conflict block and that has been resolved. This greatly improves efficiency of resolving a conflict block by the user.

The following describes in detail a method for presenting an associated conflict block provided in this disclosure with reference to a specific embodiment.

Figure 3:
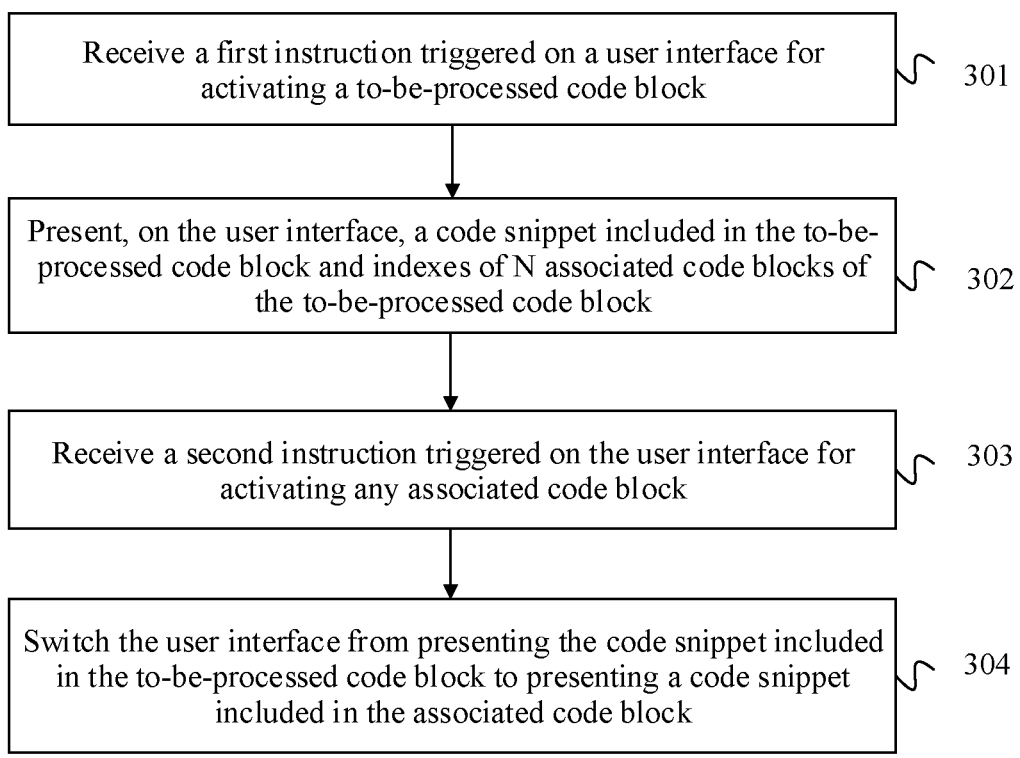
FIG. 3 is a schematic flowchart of an embodiment of a method for presenting an associated conflict block according to this disclosure.

Based on the system shown in FIG. 1, FIG. 3 is a schematic flowchart of an embodiment of a method for presenting an associated conflict block according to this disclosure. This embodiment may be performed by the terminal device in FIG. 1. As shown in FIG. 3, the method for presenting an associated conflict block provided in this embodiment includes the following steps.

S301: Receive a first instruction triggered on a user interface for activating a to-be-processed code block.

S302: Present, on the user interface, a code snippet included in the to-be-processed code block and indexes of N associated code blocks of the to-be-processed code block.

It should be noted that a type of the to-be-processed code block may be an unresolved conflict block, or may be a single-side change block. That is, in the method of this disclosure, not only an index of an associated code block of a conflict block can be presented, but also an index of an associated code block of a single-side change block can be presented.

It should be noted that a type of each associated code block in the N associated code blocks of the to-be-processed code block is one of an unresolved conflict block, a single-side change block, and a resolved conflict block. That is, in this disclosure, not only an unresolved conflict block that has an association relationship with the to-be-processed code block is presented, but also a resolved conflict block that has an association relationship with the to-be-processed code block is presented, so that a user can refer to a solution for resolving the resolved conflict block when resolving a conflict block. This improves efficiency of resolving a conflict block by the user. In addition, this disclosure further presents a single-side change block that has an association relationship with the to-be-processed code block, to avoid a problem that the user cannot locate the associated code block when a variable and/or a function in the to-be-processed code block are/is defined or used in the single-side change block.

It should be noted that an association relationship between each associated code block in the N associated code blocks of the to-be-processed code block and the to-be-processed code block is one of a dependency relationship, a depended relationship, or a similarity relationship. The user can view, by using a code block that has the dependency relationship with the to-be-processed code block, usage of a variable and/or a function defined in the to-be-processed code block, view, by using a code block that has the dependency relationship with the to-be-processed code block, a definition situation of a variable and/or a function used in the to-be-processed code block, and view, by using a code block that has the similarity relationship with the to-be-processed code block, the solution for resolving the resolved conflict block, to resolve other similar unresolved conflict blocks in batches, so as to improve the efficiency of resolving a conflict block by the user.

To make a relationship between the N associated code blocks presented on the user interface and the to-be-processed code block clearer, a dependency group, a depended group, and a similarity group may be set on the user interface, and an index of each associated code block is presented in the dependency group, the depended group, or the similarity group based on the association relationship between each associated code block and the to-be-processed code block. Further, a code block that is in the N associated code blocks and that has the dependency relationship with the to-be-processed code block may be presented in the dependency group, a code block that is in the N associated code blocks and that has the depended relationship with the to-be-processed code block may be presented in the depended group, and a code block that is in the N associated code blocks and that has the similarity relationship with the to-be-processed code block may be presented in the similarity group.

The following describes possible implementations of the first instruction.

Figure 4:
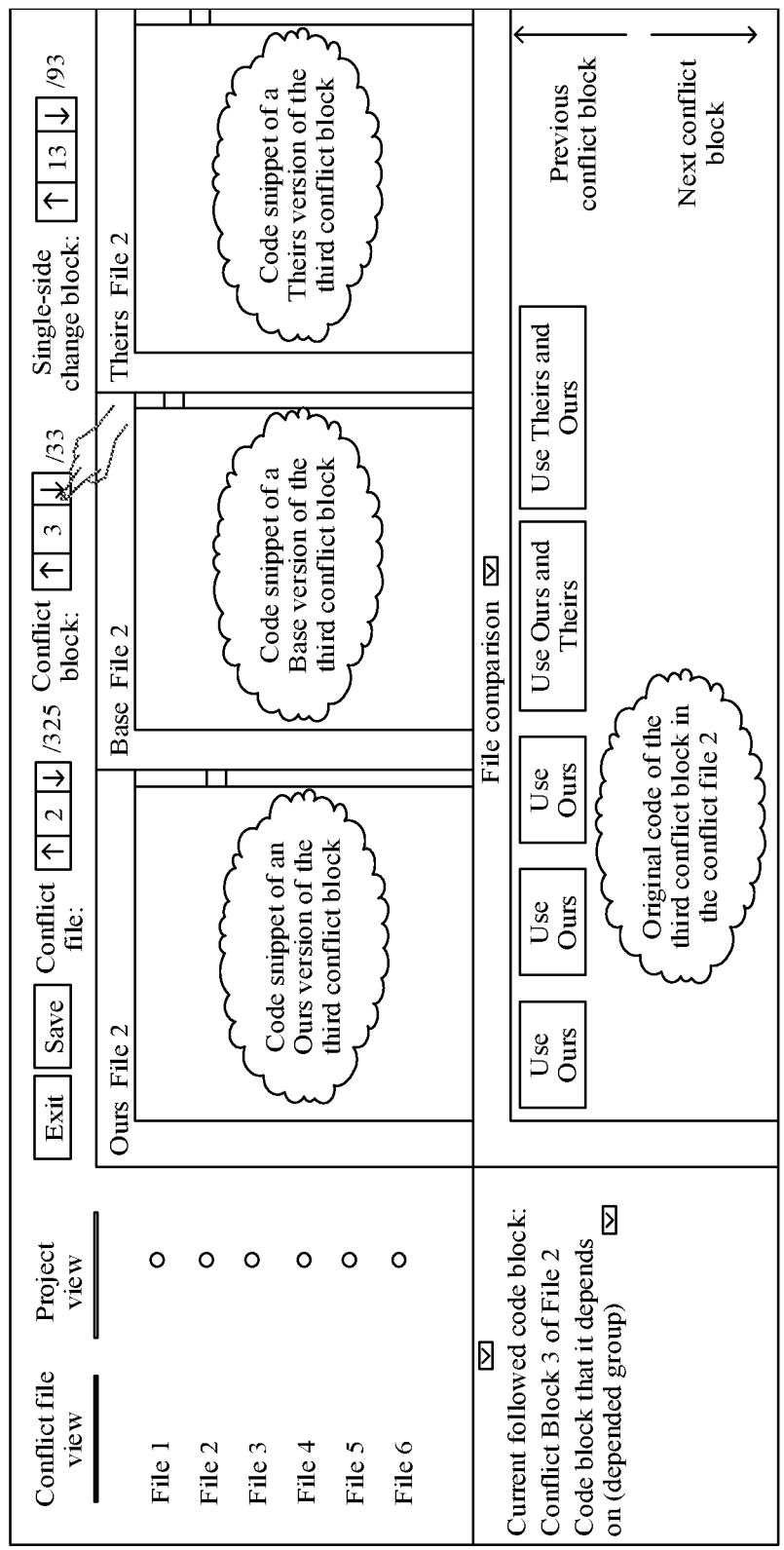
FIG. 4 is a schematic diagram of a user interface according to this disclosure.
Figure 5:
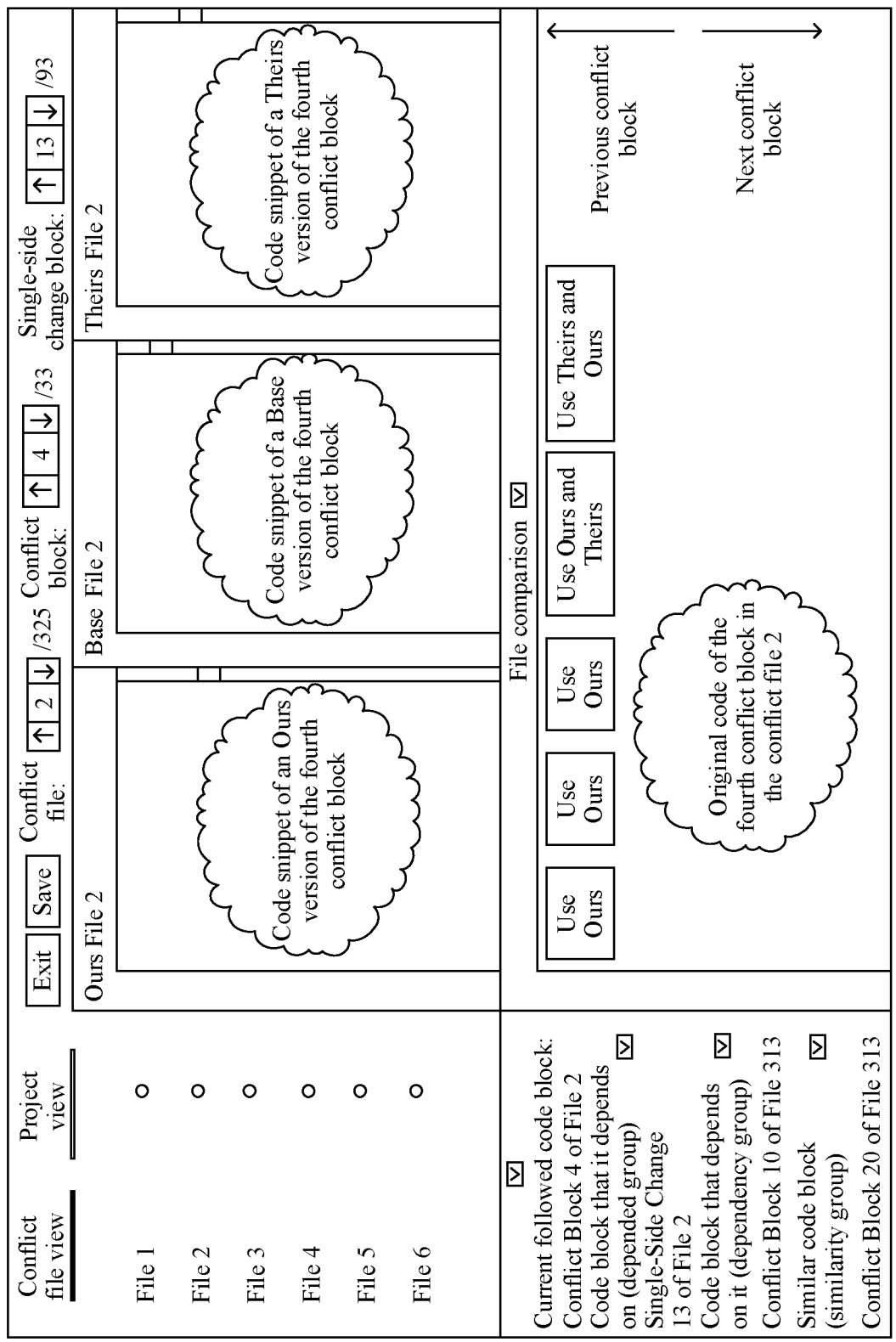
FIG. 5 is a schematic diagram of a user interface according to this disclosure.

In a possible implementation, the user may trigger, by clicking an up arrow or a down arrow next to the conflict block on the user interface shown in FIG. 4, the first instruction for activating the to-be-processed code block. In this case, the first instruction is an instruction triggered by the clicking action. For example, the to-be-processed code block is a fourth conflict block that is not resolved in a conflict file 2. After the user clicks the down arrow next to the conflict block on the user interface shown in FIG. 4, the user interface switches to FIG. 5. As shown in FIG. 5, a code snippet of an Ours version, a code snippet of a Base version, and a code snippet of a Theirs version that are of the fourth conflict block are displayed on the user interface. In addition, an index of a code block that has a dependency relationship with the fourth conflict block, an index of a code block that has a depended relationship with the fourth conflict block, and an index of a code block similar to the fourth conflict block are presented. For details, refer to FIG. 5. The code block that has a dependency relationship with the fourth conflict block is a tenth conflict block in a 313$^{th}$ conflict file (conflict block 10 of file 313), the code block that has a depended relationship with the fourth conflict block is a thirteenth single-side change block in a second conflict file (single-side change 13 of file 2), and the code block that has a similarity relationship with the fourth conflict block is a twentieth conflict block in the 313$^{th}$ conflict file (conflict block 20 of file 313).

Figure 6:
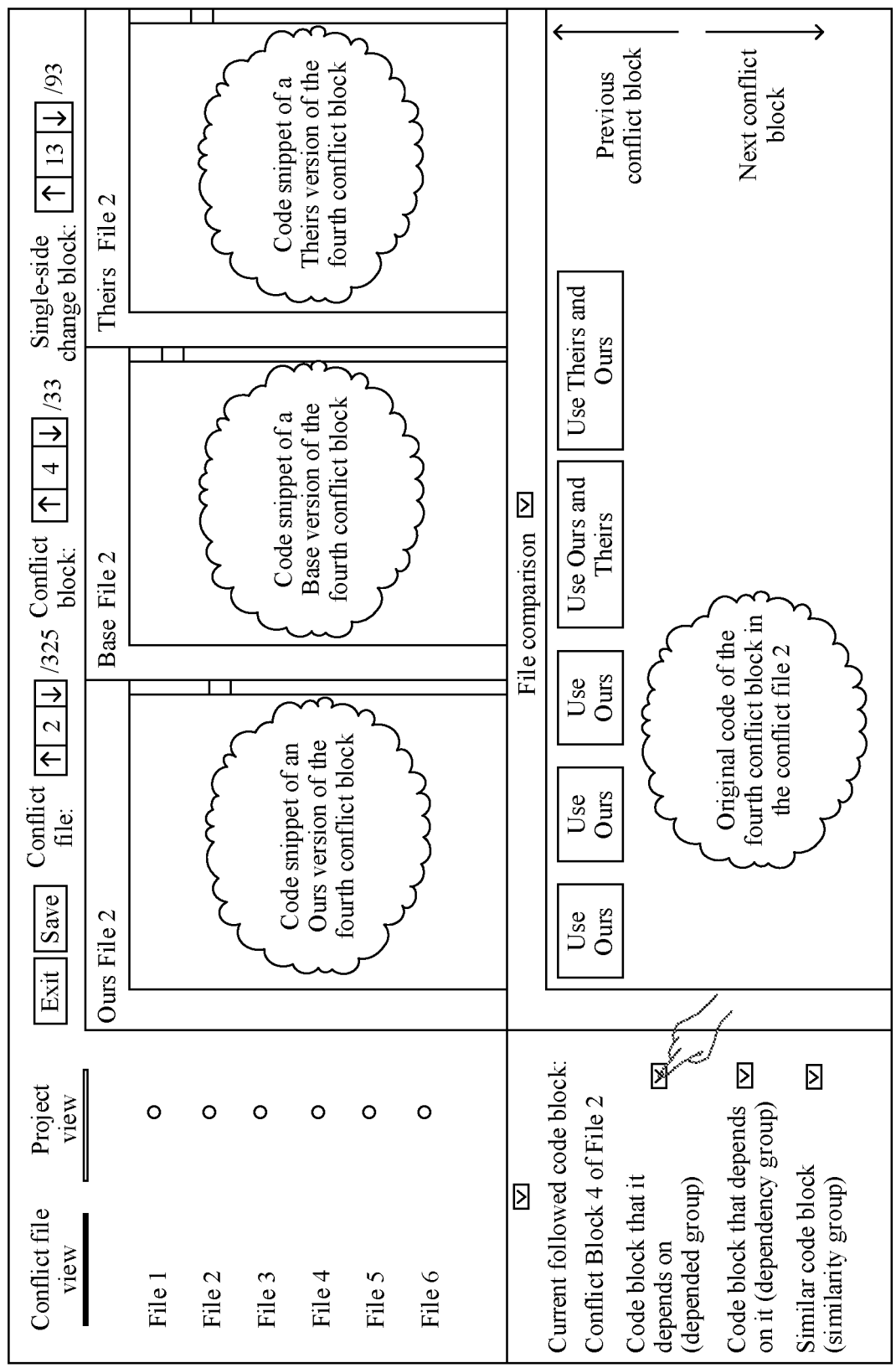
FIG. 6 is a schematic diagram of a user interface according to this disclosure.
Figure 7:
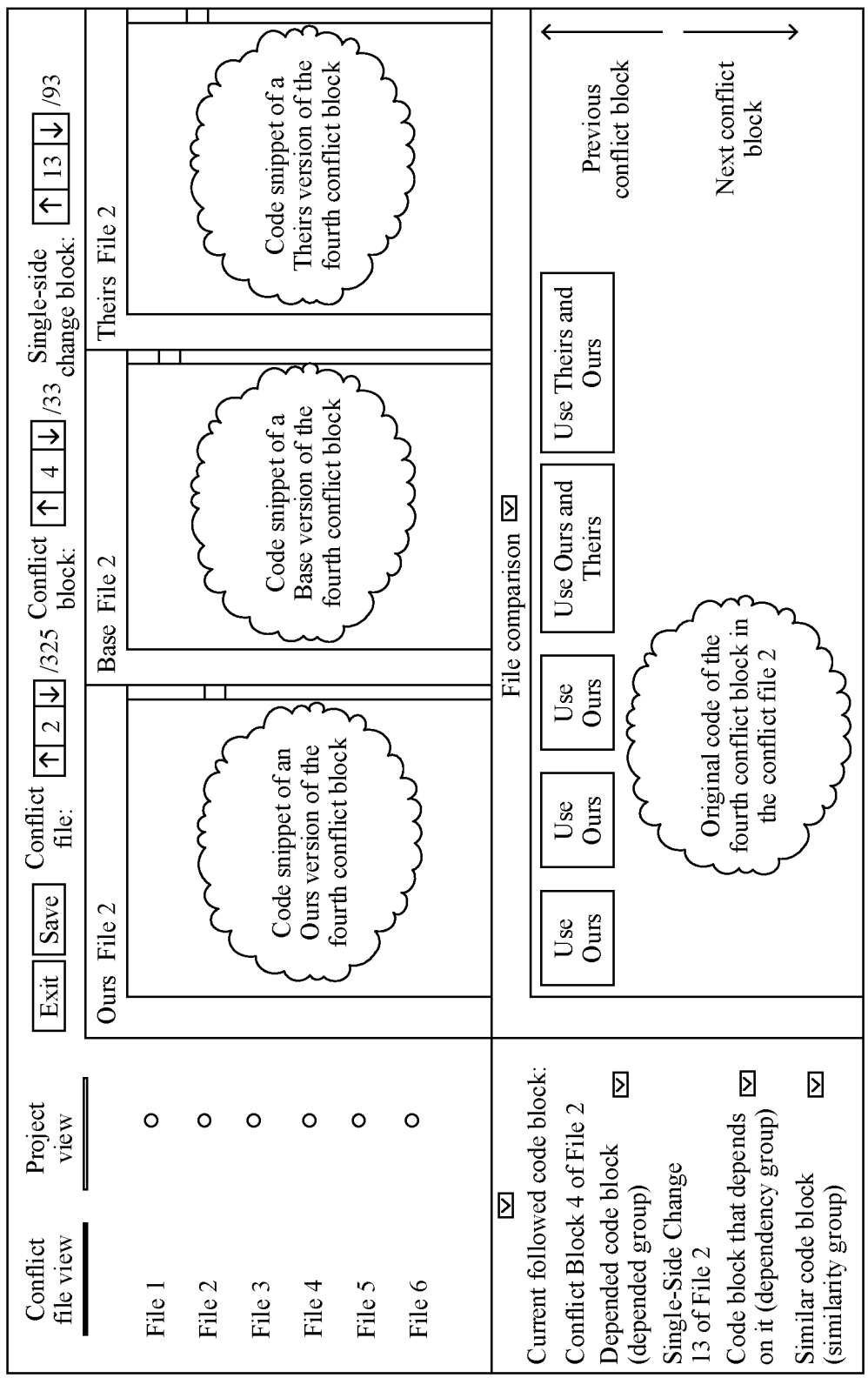
FIG. 7 is a schematic diagram of a user interface according to this disclosure.

In another possible implementation, the user may first trigger, by clicking an up arrow or a down arrow next to the conflict block on the user interface shown in FIG. 4, to display code snippets of three versions of the to-be-processed code block. In this case, the user interface switches to FIG. 6. Then, the user triggers, by clicking a drop-down button of an associated code block on the left side of the user interface shown in FIG. 6, to display the associated code block of the to-be-processed code block. For example, the user triggers, by clicking a drop-down button corresponding to a depended group, to display an index of a code block that has a depended relationship with the to-be-processed code block. In this case, the user interface switches to FIG. 7. In this case, the first instruction in S301 includes an instruction triggered when the user clicks the up arrow or the down arrow next to the conflict block in FIG. 4, and an instruction triggered when the user clicks the drop-down button of the depended group in FIG. 6.

It should be noted that, in the second implementation, a specific quantity of instructions included in the first instruction depends on a quantity of groups of drop-down buttons that the user clicks. If the user clicks drop-down buttons of the dependency group, the depended group, and the similarity group, the first instruction includes the instruction triggered when the user clicks the up arrow or the down arrow next to the conflict block in FIG. 4 and an instruction triggered when the user clicks the drop-down buttons of the three groups.

The foregoing describes a process of presenting the indexes of the N associated code blocks of the to-be-processed code block on the user interface. The following describes how to determine the N associated code blocks from the conflict file. The process may be executed by the dependency analysis module and the similarity analysis module in FIG. 2.

It should be noted that, in this disclosure, the N associated code blocks are determined from the conflict block and the single-side change block. Therefore, the conflict block needs to be first parsed from the conflict file, and the single-side change block needs to be extracted. The following first describes a conflict block parsing process and a single-side change block extraction process.

The conflict block parsing process is as follows.

Refer to the foregoing description. The conflict file includes two parts: a successfully merged part and several conflict parts. One conflict part corresponds to one conflict block. Identifiers such as "<<<<<<<<", "|||||||", "========", and ">>>>>>>>" are used to divide code snippets of different versions corresponding to each conflict part. For each conflict part, a code snippet between "<<<<<<<<" and "|||||||" is extracted as a code snippet of an Ours version of a corresponding conflict block, a code snippet between "|||||||" and "========" is extracted as a code snippet of a Base version of the corresponding conflict block, and a code snippet between "========" and ">>>>>>>>" is extracted as a code snippet of a Theirs version of the corresponding conflict block. Then, the code snippet of the Ours version is matched in a code file of the Ours version to obtain a row number range of the code snippet of the Ours version in the code file of the Ours version, the code snippet of the Base version is matched in a code file of the Base version to obtain a row number range of the code snippet of the Base version in the code file of the Base version, and the code snippet of the Theirs version is matched in a code file of the Theirs version to obtain a row number range of the code snippet of the Theirs version in the code file of the Theirs version. Code snippets within corresponding row number ranges in code files of each version are selected to form a conflict block.

The foregoing same operation is performed on all conflict files, so that conflict blocks included in each of the conflict files can be obtained.

The single-side change block extraction process is as follows.

Code files of the Ours version, the Base version, and the Theirs version are obtained by parsing the conflict file. Based on the code files of the three versions, in one aspect, a first change list of the Ours version based on the Base version is obtained. The first change list records a changed object, a changed action, a row number range of the changed object in the code file of the Ours version, and a row number range of the changed object in the code file of the Base version that are of the Ours version based on the Base version. In another aspect, a second change list of the Theirs version based on the Base version is obtained. The second change list records a changed object, a changed action, a row number range of the changed object in the code file of the Theirs version, and a row number range of the changed object in the code file of the Base version that are of the Theirs version based on the Base version. Then, based on a row number of the Base version in the foregoing two change lists, if a row number of the Base version in the first change list is not in the second change list, it is determined that a change of the row is a single-side change of the Ours version based on the Base version, and if a row number of the Base version in the second change list is not in the first change list, it is determined that a change of the row is a single-side change of the Theirs version based on the Base version. Code snippets within row number ranges corresponding to single-side changes in code files of each version are selected to form a single-side change block.

The foregoing same operation is performed on all conflict files, so that single-side change blocks included in each of the conflict files can be obtained.

It should be noted that, in this disclosure, N associated conflict blocks of the to-be-processed code block need to be determined from the conflict blocks and the single-side change blocks that are included in all the obtained conflict files, and all the conflict files may be classified into two types. A first type is a conflict file in which the to-be-processed code block is located, and a second type is a conflict file that does not include the to-be-processed code block. For ease of description, in the following, the first type of conflict file is referred to as a first conflict file, and the second type of conflict file is referred to as a second conflict file. In this disclosure, a method for determining the associated code block of the to-be-processed code block from the first conflict file is the same as a method for determining the associated code block of the to-be-processed code block from the second conflict file. Therefore, the following uses the first conflict file as an example to describe a process of determining the associated conflict block.

The following describes how to determine, from a conflict block and a single-side change block included in the first conflict file, code blocks that have a dependency relationship and a depended relationship with the to-be-processed code block.

After the foregoing conflict block parsing and single-side change extraction are performed on the first conflict file, a plurality of conflict blocks and single-side change blocks that are included in the first conflict file can be obtained. For ease of description, the conflict blocks and the single-side change blocks are collectively referred to as code blocks. That is, the first conflict file includes a plurality of code blocks, and each code block includes a code snippet of an Ours version of the code block, a code snippet of a Base version of the code block, and a code snippet of a Theirs version of the code block.

The conflict block or the single-side change block is caused by two- or one-side change to a same variable and/or function. Therefore, code snippets of three versions of the code block relate to the same variable and/or function. For each code block, a variable and/or function defined and a variable and/or function used in the code block may be stored, and then based on usage of the variable and/or function in the to-be-processed code block in another code block other than the to-be-processed code block in the first conflict file, associated code blocks that have a dependency relationship and a depended relationship with the to-be-processed code block are determined.

In a possible implementation, a variable defined and a variable used in a code block may be stored in the following manner: a variable declaration map, a variable using pap, a variable depending list, and a variable depended list are defined in each code block.

Data structures of the variable declaration map, the variable using map, the variable depending list, and the variable depended list may be as follows:

$$ConflictBlock = \begin{Bmatrix} \text{Map} < QualifiedName, \text{Var} > varDeclaration; \\ \text{Map} < QualifiedName, \text{List} < \text{Var} >> varUsing; \\ \text{List} < \text{Var} > varDepending; \\ \text{List} < \text{Var} > varDepended; \end{Bmatrix}$$

A data structure of each variable Var may be defined as follows:

$$\text{Var} = \begin{Bmatrix} \text{Integer } startLine; \\ \text{Integer } endLine; \\ \text{String } varRawData; \\ \text{Integer } blockIndex \\ \text{String } fileName \end{Bmatrix}$$

Herein, Integer startLine indicates a start line of the variable, Integer endLine indicates an end line of the variable, String varRawData indicates original code that defines or uses the variable, Integer blockIndex indicates a conflict block index, and String fileName indicates a conflict file name.

In a possible implementation, it may be determined whether the variable defined in the to-be-processed code block is used in another code block other than the to-be-processed code block in the first conflict file. If a determining result is that the variable defined in the to-be-processed code block is used in M code blocks, it is determined that the M code blocks are all associated code blocks that have a dependency relationship with the to-be-processed code block, and indexes of the M code blocks may be placed in a variable depending list of the to-be-processed code block.

In addition, it may be determined whether the variable used in the to-be-processed code block is defined in another code block other than the to-be-processed code block in the first conflict file. If a determining result is that the variable used in the to-be-processed code block is defined in K code blocks, it is determined that the K code blocks are all associated code blocks that have a depended relationship with the to-be-processed code block, and indexes of the K code blocks may be placed in a variable depended list of the to-be-processed code block.

It should be noted that the foregoing method for determining, based on the variable, the associated code block that has the dependency relationship with the to-be-processed code block and the associated code block that has the depended relationship with the to-be-processed code block is applicable to the function, and details are not described for the function in this disclosure.

The following describes how to determine, from a conflict block and a single-side change block included in the first conflict file, a code block that has a similarity relationship with the to-be-processed code block.

Similar to the dependency relationship and the depended relationship, after the foregoing conflict block parsing and single-side change extraction are performed on the first conflict file, a plurality of conflict blocks and single-side change blocks that are included in the first conflict file can be obtained. For ease of description, the conflict blocks and the single-side change blocks are collectively referred to as code blocks. That is, the first conflict file includes a plurality of code blocks, and each code block includes a code snippet of an Ours version of the code block, a code snippet of a Base version of the code block, and a code snippet of a Theirs version of the code block.

In a possible implementation, an associated code block that has a similarity relationship with the to-be-processed code block may be determined based on token strings and abstract syntax subtrees that are separately corresponding to code snippets of the Ours version, the Base version, and the Theirs version that are included in the to-be-processed code block.

In the foregoing possible implementation, a process of determining the associated code block with the similarity relationship may be divided into the following steps.

Step 1: For each code block other than the to-be-processed code block in the plurality of code blocks included in the first conflict file, calculate a token similarity (denoted as "token similarity of the Ours version") between a code snippet of the Ours version of the to-be-processed code block and a code snippet of an Ours version of the code block, calculate a token similarity (denoted as "token similarity of the Base version") between a code snippet of the Base version of the to-be-processed code block and a code snippet of a Base version of the code block, and calculate a token similarity (denoted as "token similarity of the Theirs version") between a code snippet of the Theirs version of the to-be-processed code block and a code snippet of a Theirs version of the code block.

If a token similarity of code snippets of versions between two code blocks needs to be calculated, token strings corresponding to the code snippets of the versions of the two code blocks need to be extracted first. For example, if a token similarity between the code snippet of the Ours version of the to-be-processed code block and a code snippet of an Ours version of a code block needs to be calculated, a token string corresponding to the code snippet of the Ours version of the to-be-processed code block and a token string corresponding to the code snippet of the Ours version of the code block need to be extracted first. Then, the token similarity between the two is determined by using a similarity calculation method of a cosine included angle.

The following describes a process of extracting a token string by using the code snippet of the Ours version of the to-be-processed code block as an example. A conversion tool such as a GOOGLE JAVA format is used to perform token conversion on the code snippet of the Ours version by row, and remove tokens that have little impact on code content, such as parentheses, semicolons, commas, colons, arithmetic operators, logical operators, and bitwise operators, to obtain a token string corresponding to the code snippet of the Ours version.

Step 2: For each code block other than the to-be-processed code block in the plurality of code blocks included in the first conflict file, calculate a structure similarity (denoted as "structure similarity of the Ours version") between a code snippet of the Ours version of the to-be-processed code block and a code snippet of an Ours version of the code block, calculate a structure similarity (denoted as "structure similarity of the Base version") between a code snippet of the Base version of the to-be-processed code block and a code snippet of a Base version of the code block, and calculate a structure similarity (denoted as "structure similarity of the Theirs version") between a code snippet of the Theirs version of the to-be-processed code block and a code snippet of a Theirs version of the code block.

If a structure similarity of code snippets of versions between two code blocks needs to be calculated, abstract syntax subtrees corresponding to the code snippets of versions of the two code blocks need to be determined first. For example, if a structure similarity between the code snippet of the Ours version of the to-be-processed code block and a code snippet of an Ours version of a code block needs to be calculated, an abstract syntax subtree corresponding to the code snippet of the Ours version of the to-be-processed code block and an abstract syntax subtree corresponding to the code snippet of the Ours version of the code block need to be determined first. Then, the structure similarity between the two is determined by using the two abstract syntax subtrees.

The following describes a process of determining an abstract syntax subtree by using the code snippet of the Ours version of the to-be-processed code block as an example parsing a code file of the Ours version in which the code snippet of the Ours version of the to-be-processed code block is located, to obtain an abstract syntax tree corresponding to the code file of the Ours version, searching the abstract syntax tree, and determining that a subtree that is on the abstract syntax tree and whose row number range falls within a row number range corresponding to the code snippet of the Ours version is the abstract syntax subtree corresponding to the code snippet of the Ours version.

It should be noted that, after the two abstract syntax subtrees are obtained, the two subtrees are separately traversed, a similarity of a corresponding node is calculated, two nodes whose similarity values are greater than a preset threshold are matched into a pair, then a ratio of a quantity of nodes corresponding to matching of the two subtrees to a total quantity of nodes of the two subtrees is calculated by using a Jaccard similarity coefficient, and the ratio is used as the structure similarity between the two subtrees.

Step 3: Determine, based on the token similarity and the structure similarity between the code snippet of the Ours version of the to-be-processed code block and the code snippet of the Ours version of each code block, the token similarity and the structure similarity between the code snippet of the Base version of the to-be-processed code block and the code snippet of the Base version of each code block, and the token similarity and the structure similarity between the code snippet of the Theirs version of the to-be-processed code block and the code snippet of the Theirs version of each code block that are obtained in step 1 and step 2, the associated code block that has the similarity relationship with the to-be-processed code.

In a possible implementation, this step may further include the following several steps.

Step A: First perform weighted averaging on the token similarity and the structure similarity between the code snippet of the Ours version of the to-be-processed code block and the code snippet of the Ours version of each code block, to obtain a first similarity value between the code snippet of the Ours version of the to-be-processed code block and the code snippet of the Ours version of each code block, perform weighted averaging on the token similarity and the structure similarity between the code snippet of the Base version of the to-be-processed code block and the code snippet of the Base version of each code block, to obtain a first similarity value between the code snippet of the Base version of the to-be-processed code block and the code snippet of the Base version of each code block, and perform weighted averaging on the token similarity and the structure similarity between the code snippet of the Theirs version of the to-be-processed code block and the code snippet of the Theirs version of each code block, to obtain a first similarity value between the code snippet of the Theirs version of the to-be-processed code block and the code snippet of the Theirs version of each code block.

Step B: Perform weighted averaging on the three first similarity values between the to-be-processed code block and each code block, to obtain a second similarity value between the to-be-processed code block and each code block.

Step C: Determine a code block that is in another code block other than the to-be-processed code block in the first conflict file and whose second similarity value is greater than a preset threshold as the associated code block that has the similarity relationship with the to-be-processed code block.

It should be noted that, code blocks that are in the first conflict file and used for performing the foregoing association analysis are obtained through the conflict block parsing process and the single-side change extraction process described above. Some of these code blocks may have been resolved by the user, and some may not be resolved. Regardless of a state of the code block, the code block is in the preceding association analysis scope.

S304: Receive a second instruction triggered on the user interface for activating any associated code block.

S305: Switch the user interface from presenting the code snippet included in the to-be-processed code block to presenting a code snippet included in the associated code block.

Figure 8:
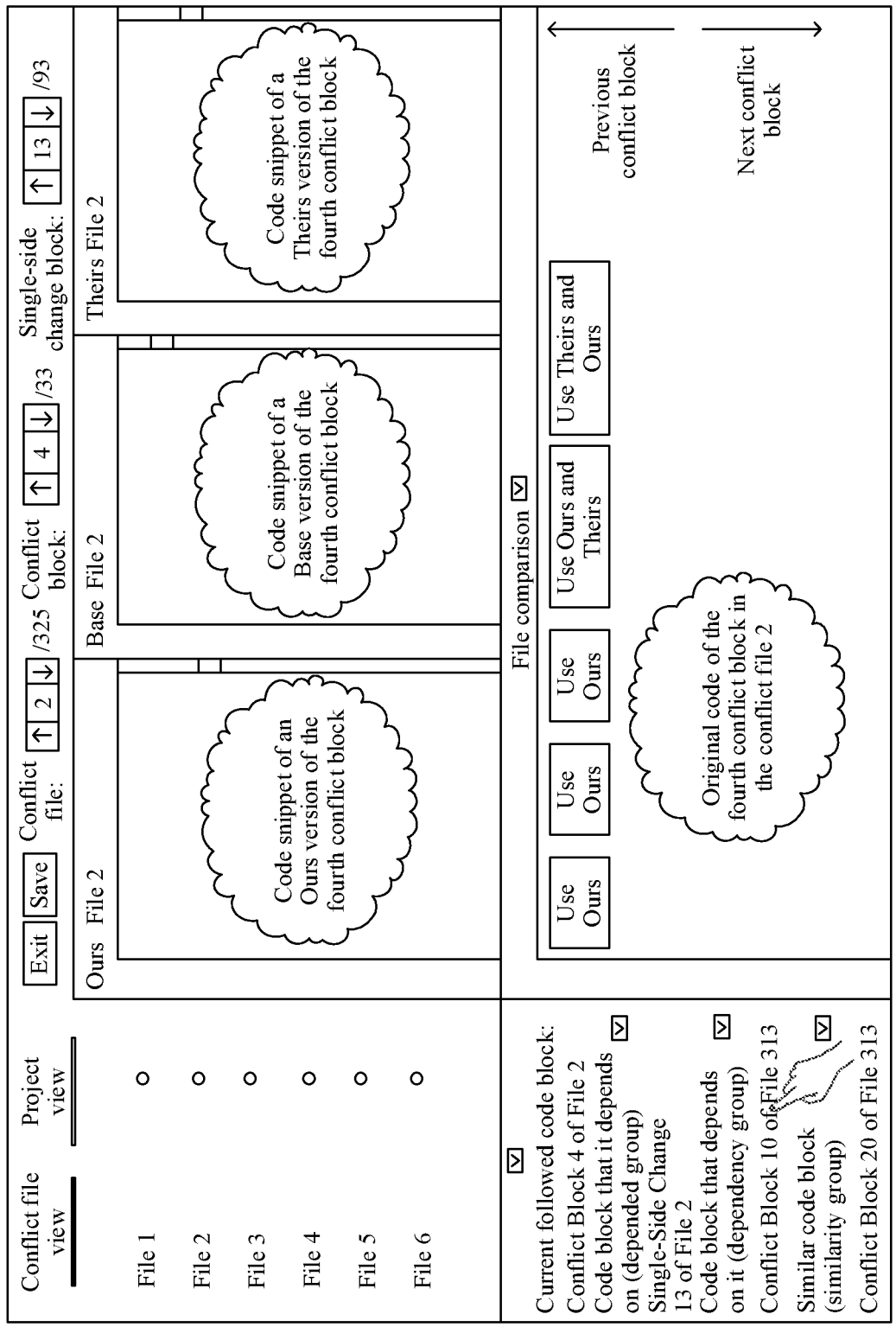
FIG. 8 is a schematic diagram of a user interface according to this disclosure.

Refer to FIG. 8. The user may click an index of any associated code block to trigger a second instruction for activating the associated code block. For example, the user may click the tenth conflict block in the 313$^{th}$ conflict file (conflict block 10 of file 313) in the dependency group to trigger a second instruction for activating the conflict block. After receiving the second instruction, the terminal device may switch the user interface to a code snippet included in the associated code block. For example, the user clicks the tenth conflict block in the 313$^{th}$ conflict file (conflict block 10 of file 313) in the dependency group, and the user interface switches to FIG. 9. The user may view, in FIG. 9, usage of a variable and/or a function defined by a fourth conflict block (the to-be-processed code block) in a second conflict file in the tenth conflict block in the 313$^{th}$ conflict file. This accelerates a speed of understanding and analyzing a conflict block by the user, and improves resolution efficiency.

In a possible implementation, the user may click a back button in FIG. 9 to return to a code snippet included in the to-be-processed code block (the fourth conflict block in the second conflict file), and the user may switch back and forth between the to-be-processed code block and the associated code block by using the button. This improves user experience.

According to the method for presenting an associated conflict block provided in this embodiment, an associated code block list of a current conflict block is obtained by using a dependency analysis module and a similarity analysis module, so that after the current conflict block is activated, a terminal device may present indexes of these associated code blocks on a user interface. When a user needs to view a code snippet included in an associated code block, the user clicks an index of the associated code block, and the user interface may switch to the code snippet included in the associated code block. In this way, the user can quickly find a definition and usage of a variable and/or a function in the current conflict block, and can refer to a solution for resolving a code block that is similar to the current conflict block and that has been resolved. This greatly improves efficiency of resolving a conflict block by the user.

Figure 10:
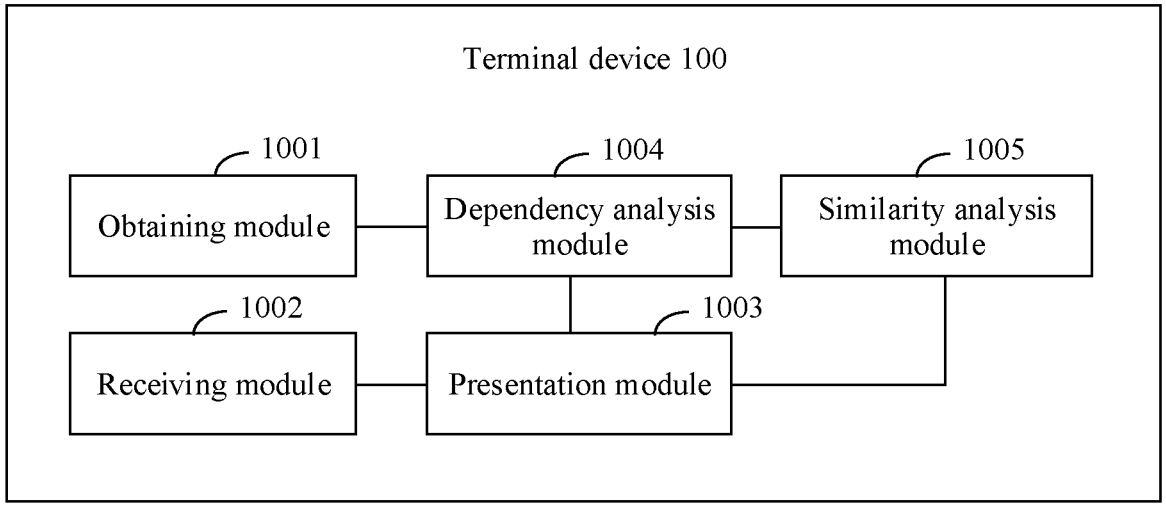
FIG. 10 is a schematic diagram of a structure of a terminal device according to this disclosure.

FIG. 10 is a schematic diagram of a structure of a terminal device 100 according to this disclosure. As shown in FIG. 10, the terminal device 100 provided in this embodiment includes an obtaining module 1001 configured to obtain a first conflict file, where the first conflict file includes a plurality of code blocks, and each code block includes a code snippet of a current version of the code block, a code snippet of a basic version of the code block, and a code snippet of a to-be-merged version of the code block, a receiving module 1002 configured to receive a first instruction triggered on a user interface for activating a to-be-processed code block, where a type of the to-be-processed code block is an unresolved conflict block or a single-side change block, and a presentation module 1003 configured to present, on the user interface, a code snippet included in the to-be-processed code block and indexes of N associated code blocks of the to-be-processed code block.

A type of each associated code block is one of an unresolved conflict block, a single-side change block, and a resolved conflict block, an association relationship between each associated code block and the to-be-processed code block is one of a dependency relationship, a depended relationship, and a similarity relationship, and N is greater than or equal to 1.

Optionally, the receiving module 1002 is further configured to receive a second instruction triggered on the user interface for activating any associated code block.

The presentation module 1003 is further configured to switch the user interface from presenting the code snippet included in the to-be-processed code block to presenting a code snippet included in the associated code block.

Optionally, the user interface has a dependency group, a depended group, and a similarity group. The presentation module 1003 is further configured to present an index of each associated code block in the dependency group, the depended group, or the similarity group based on an association relationship between each associated code block and the to-be-processed code block.

Optionally, the terminal device in this embodiment further includes a dependency analysis module 1004 and a similarity analysis module 1005, as shown in FIG. 2. The dependency analysis module 1004 and the similarity analysis module 1005 are configured to determine at least one associated code block of the to-be-processed code block from the first conflict file.

Optionally, the obtaining module 1001 is further configured to obtain a second conflict file.

The dependency analysis module 1004 and the similarity analysis module 1005 are further configured to determine at least one associated code block of the to-be-processed code block from the second conflict file.

Optionally, the dependency analysis module 1004 and the similarity analysis module 1005 are further configured to determine, from the first conflict file based on usage of a variable and/or a function in the to-be-processed code block in another code block of the first conflict file, an associated code block that has the dependency relationship with the to-be-processed code block and an associated code block that has the depended relationship with the to-be-processed code block, and/or determine, from the first conflict file based on a token string and an abstract syntax subtree that are corresponding to each code snippet included in the to-be-processed code block, an associated code block that has the similarity relationship with the to-be-processed code block.

The terminal device provided in this disclosure may perform the steps in the foregoing method embodiment. Implementation principles and beneficial effects of the terminal device are similar to those of the method embodiment. Details are not described herein again.

Figure 11:
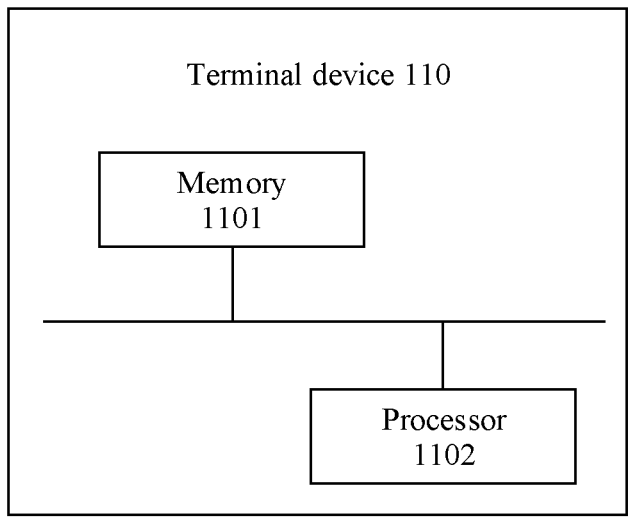
FIG. 11 is a schematic diagram of a hardware structure of a terminal device according to this disclosure.

FIG. 11 is a schematic diagram of a hardware structure of a terminal device 110 according to this disclosure. As shown in FIG. 11, the terminal device 110 includes a memory 1101 and at least one processor 1102. The memory 1101 is configured to store program instructions, and the at least one processor 1102 is configured to invoke the program instructions in the memory 1101 to perform the steps in the foregoing method embodiment. Implementation principles and beneficial effects thereof are similar to those of the method embodiment. Details are not described herein again.

This disclosure further provides a readable storage medium. The readable storage medium stores executable instructions. When executing the executable instructions, the at least one processor 1102 of the terminal device 110 implements the steps in the foregoing method embodiment. Implementation principles and beneficial effects thereof are similar to those of the method embodiment. Details are not described herein again.

This disclosure further provides a program product. The program product includes computer programs (namely, executable instructions). The computer programs are stored in a readable storage medium. The at least one processor 1102 of the terminal device 110 may read the computer programs from the readable storage medium, and the at least one processor 1102 executes the computer programs, so that the terminal device 110 implements the method for presenting an associated conflict block provided in the foregoing implementations.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for presenting an associated conflict block and comprising:
   obtaining a first conflict file comprising a plurality of first code blocks, wherein a second code block of the first code blocks comprises a first code snippet of a current version of the second code block, a second code snippet of a basic version of the second code block, and a third code snippet of a to-be-merged version of the second code block;
   receiving, from a user interface, a first instruction for activating a to-be-processed code block, wherein a first type of the to-be-processed code block is an unresolved conflict block or a single-side change block;
   presenting, on the user interface in response to the first instruction, a fourth code snippet comprised in the to-be-processed code block and indexes of N associated code blocks of the to-be-processed code block, wherein a second type of each of the N associated code blocks is one of the unresolved conflict block, the single-side change block, or a resolved conflict block, wherein an association relationship between each of the N associated code blocks and the to-be-processed code block is one of a dependency relationship, a depended relationship, or a similarity relationship, and wherein N is greater than or equal to 1;
   receiving, from the user interface, a second instruction for activating one of the N associated code blocks by clicking an index of the N associated code blocks; and
   switching the user interface from presenting the fourth code snippet to presenting a fifth code snippet comprised in the one of the N associated code blocks.

2. The method of claim 1, wherein the user interface has a dependency group, a depended group, and a similarity group, and wherein the method further comprises further presenting the index in the dependency group based on the association relationship.

3. The method of claim 1, wherein before presenting the indexes, the method further comprises determining at least one associated code block of the to-be-processed code block from the first conflict file.

4. The method of claim 1, wherein before presenting the indexes, the method further comprises:
   obtaining a second conflict file; and
   determining at least one associated code block of the to-be-processed code block from the second conflict file.

5. The method of claim 3, further comprising:
   determining, from the first conflict file based on usage of a variable and a function in the to-be-processed code block in a third code block of the first conflict file, a first associated code block comprising the dependency relationship with the to-be-processed code block and a second associated code block comprising the depended relationship with the to-be-processed code block; and
   determining, from the first conflict file based on a token string and an abstract syntax subtree that are corresponding to each code snippet comprised in the to-be-processed code block, a third associated code block comprising the similarity relationship with the to-be-processed code block.

6. The method of claim 1, wherein the user interface has a dependency group, a depended group, and a similarity group, and wherein the method further comprises further presenting the index in the depended group based on an association relationship between each of the N associated code blocks and the to-be-processed code block.

7. The method of claim 1, wherein the user interface has a dependency group, a depended group, and a similarity group, and wherein the method further comprises further presenting the index in the similarity group based on an association relationship between each of the N associated code blocks and the to-be-processed code block.

8. The method of claim 3, further comprising determining, from the first conflict file based on usage of a variable and a function in the to-be-processed code block in a third code block of the first conflict file, a first associated code block comprising the dependency relationship with the to-be-processed code block and a second associated code block comprising the depended relationship with the to-be-processed code block.

9. The method of claim 3, further comprising determining, from the first conflict file based on usage of a variable in the to-be-processed code block in a third code block of the first conflict file, a first associated code block comprising the dependency relationship with the to-be-processed code block and a second associated code block comprising the depended relationship with the to-be-processed code block.

10. The method of claim 3, further comprising determining, from the first conflict file based on usage of a function in the to-be-processed code block in a third code block of the first conflict file, a first associated code block comprising the dependency relationship with the to-be-processed code block and a second associated code block comprising the depended relationship with the to-be-processed code block.

11. The method of claim 3, further comprising determining, from the first conflict file based on a token string and an abstract syntax subtree that are corresponding to each code snippet comprised in the to-be-processed code block, an associated code block comprising the similarity relationship with the to-be-processed code block.

12. A terminal device comprising:
a memory configured to store program instructions; and
a processor coupled to the memory and configured to execute the program instructions to cause the terminal device to:
obtain a first conflict file comprising a plurality of first code blocks, wherein a second code block of the first code blocks comprises a first code snippet of a current version of the second code block, a second code snippet of a basic version of the second code block, and a third code snippet of a to-be-merged version of the second code block;
receive, from a user interface, a first instruction for activating a to-be-processed code block, wherein a first type of the to-be-processed code block is of an unresolved conflict block or a single-side change block;
present, on the user interface in response to the first instruction, a fourth code snippet comprised in the to-be-processed code block and indexes of N associated code blocks of the to-be-processed code block, wherein a second type of each of the N associated code blocks is one of the unresolved conflict block, the single-side change block, or a resolved conflict block, wherein an association relationship between each of the N associated code blocks and the to-be-processed code block is one of a dependency relationship, a depended relationship, or a similarity relationship, and wherein N is greater than or equal to 1;
receive, from the user interface, a second instruction for activating one of the N associated code blocks by clicking an index of the N associated code blocks; and
switch the user interface from presenting the fourth code snippet to presenting a fifth code snippet comprised in the one of the N associated code blocks.

13. The terminal device of claim 12, wherein the user interface has a dependency group, a depended group, and a similarity group, and wherein the processor is further configured to execute the program instructions to cause the terminal device to further present the index in the dependency group based on the association relationship.

14. The terminal device of claim 12, wherein before presenting the indexes, the processor is further configured to execute the program instructions to cause the terminal device to determine at least one associated code block of the to-be-processed code block from the first conflict file.

15. The terminal device of claim 13, wherein the processor is further configured to execute the program instructions to cause the terminal device to:
determine, from the first conflict file based on usage of a variable or a function in the to-be-processed code block in a third code block of the first conflict file, a first associated code block comprising the dependency relationship with the to-be-processed code block and a second associated code block comprising the depended relationship with the to-be-processed code block; or
determine, from the first conflict file based on a token string and an abstract syntax subtree that are corresponding to each code snippet comprised in the to-be-processed code block, a third associated code block comprising the similarity relationship with the to-be-processed code block.

16. The terminal device of claim 12, wherein the user interface has a dependency group, a depended group, and a similarity group, and wherein the processor is further configured to execute the program instructions to cause the terminal device to further present the index in the depended group based on the association relationship.

17. The terminal device of claim 12, wherein the user interface has a dependency group, a depended group, and a similarity group, and wherein the processor is further configured to execute the program instructions to cause the terminal device to further present the index in the similarity group based on the association relationship.

18. A computer program product comprising computer-executable instructions that are stored on a non-transitory computer-readable medium and that, when executed by a processor, cause an apparatus to:
obtain a first conflict file comprising a plurality of first code blocks, wherein a second code block of the first code blocks comprises a first code snippet of a current version of the second code block, a second code snippet of a basic version of the second code block, and a third code snippet of a to-be-merged version of the second code block;
receive, from a user interface, a first instruction for activating a to-be-processed code block, wherein a first type of the to-be-processed code block is of an unresolved conflict block or a single-side change block;
present, on the user interface and in response to the first instruction, a fourth code snippet comprised in the to-be-processed code block and indexes of N associated code blocks of the to-be-processed code block, wherein a second type of each of the N associated code blocks is one of the unresolved conflict block, the single-side change block, or a resolved conflict block, wherein an association relationship between each of the N associated code blocks and the to-be-processed code block is one of a dependency relationship, a depended relationship, or a similarity relationship, and wherein N is greater than or equal to 1;
receive, from the user interface, a second instruction for activating one of the N associated code blocks by clicking an index of the N associated code blocks; and
switch the user interface from presenting the fourth code snippet to presenting a fifth code snippet comprised in the one of the N associated code blocks.

19. The computer program product of claim 18, wherein the user interface has a dependency group, a depended group, and a similarity group.

20. The computer program product of claim 19, wherein the instructions, when executed by the processor, cause the apparatus to further present the index in the dependency group based on the association relationship.

* * * * *